US012128689B2

(12) United States Patent
Oguchi

(10) Patent No.: US 12,128,689 B2
(45) Date of Patent: Oct. 29, 2024

(54) IMAGE RECORDING APPARATUS

(71) Applicant: BROTHER KOGYO KABUSHIKI KAISHA, Nagoya (JP)

(72) Inventor: Tomoya Oguchi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 59 days.

(21) Appl. No.: 17/817,376

(22) Filed: Aug. 4, 2022

(65) Prior Publication Data

US 2023/0058748 A1 Feb. 23, 2023

(30) Foreign Application Priority Data

Aug. 19, 2021 (JP) ................................ 2021-134029

(51) Int. Cl.
*B41J 2/175* (2006.01)
*B41M 5/00* (2006.01)

(52) U.S. Cl.
CPC ....... *B41J 2/17566* (2013.01); *B41J 2/17513* (2013.01); *B41M 5/0023* (2013.01)

(58) Field of Classification Search
CPC ................ B41J 2/17566; B41J 2/17513; B41J 2002/17573; B41J 2/17509; B41J 29/13; B41J 29/38; B41J 2002/17569; B41M 5/0023
See application file for complete search history.

(56) References Cited

FOREIGN PATENT DOCUMENTS

| | | | | | |
|---|---|---|---|---|---|
| JP | 2002264356 | A | | 9/2002 | |
| JP | 2006198969 | A | | 8/2006 | |
| JP | 2006212853 | A | | 8/2006 | |
| JP | 2020168845 | A | * | 10/2020 | ................ B41J 2/01 |

OTHER PUBLICATIONS

Yoshikawa, Hirokazu et al., "Printing Apparatus And Ink Remaining Amount Detection Method Thereof" (JP 2020168845 A), Oct. 15, 2020, Abstract, Description of Embodiments: Outline explanation of recording device (Year: 2020).*

* cited by examiner

*Primary Examiner* — Lisa Solomon
(74) *Attorney, Agent, or Firm* — Scully, Scott, Murphy & Presser, PC

(57) ABSTRACT

An image recording apparatus includes a controller configured to: (a) when a remaining amount of ink at the time of receiving a recording start instruction to start image recording on one recording medium is equal to or less than a predetermined amount and a calculated ink remaining amount is less than a required ink amount, not to start the image recording; and (b) when the remaining amount of ink at the time of receiving the recording start instruction is more than the predetermined amount, start the image recording according to the recording start instruction and, during the image recording according to the recording start instruction, when the remaining amount of ink is equal to or less than the predetermined amount and the calculated ink remaining amount is equal to or less than a threshold, interrupt the image recording.

13 Claims, 7 Drawing Sheets

IMAGE RECORDING APPARATUS

REFERENCE TO RELATED APPLICATIONS

This application claims priority from Japanese Patent Application No. 2021-134029 filed on Aug. 19, 2021. The entire content of the priority application is incorporated herein by reference.

BACKGROUND ART

A related art discloses an inkjet printing device (an image recording apparatus) that records an image by discharging ink supplied from a removable ink cartridge onto a sheet. The inkjet printing device includes an optical unit (a remaining amount sensor) that optically detects a remaining amount of ink stored in the ink cartridge. When the optical unit detects that a remaining amount of ink is equal to or less than a predetermined amount, counting of the number of discharged dots is started. When a predetermined first number of discharged dots is counted, it is determined that the remaining amount of ink is zero (empty), and a printing operation is stopped. When image recording onto one sheet is interrupted, image quality of a recorded image may be lowered. Therefore, during image recording onto one sheet, it is preferable to prevent the image recording from being interrupted due to the running out of ink in the ink cartridge.

DESCRIPTION

When image recording onto one sheet is interrupted, image quality of a recorded image may be lowered. Therefore, during image recording onto one sheet, it is preferable to prevent the image recording from being interrupted due to the running out of ink in the ink cartridge.

Here, it is considered to set a threshold for determining that a remaining amount of ink calculated based on a discharge amount of ink after the remaining amount sensor detects that a remaining amount of ink is equal to or less than a predetermined amount is empty to an amount of ink that can be applied (solid-printed) to the entire surface of one sheet of a standard size such as an A4 size. In this case, when it is determined that the remaining amount of ink is not empty at a time point before the start of image recording on a sheet of the standard size, even if the remaining amount of ink falls below the threshold during recording the image on the sheet of the standard size, ink does not run out in the middle of recording an image on one sheet of the standard size. However, in such a case, when image recording is performed on a sheet having a size larger than the standard size, such as a long sheet, even if it is determined that the remaining amount of ink is not empty at a time point before the start of image recording, a situation may occur in which ink runs out in the middle of image recording.

In a case where image recording is performed on a sheet having a size larger than the standard size, ink may run out in the middle of image recording even though the remaining amount sensor does not detect that the remaining amount of ink is equal to or less than the predetermined amount at a time point before the start of image recording. For example, when a user is allowed to replace a new ink cartridge before image recording is performed on a sheet having a size larger than the standard size, a large amount of ink is wasted.

Illustrative aspects of the present disclosure provide an image recording apparatus that can reduce a situation in which ink runs out in the middle of recording an image on one recording medium, and reducing waste of ink.

An image recording apparatus includes: a cartridge installation portion, an ink cartridge being removably installed in the cartridge installation portion; a sensor configured to detect whether a remaining amount of ink in the ink cartridge installed in the cartridge installation portion is equal to or less than a predetermined amount; recording head having a nozzle configured to discharge ink supplied from the ink cartridge, the recording head being configured to record an image on a recording medium with the ink discharged from the nozzle; a memory; and a controller. The controller is configured to: determine whether the remaining amount of ink is equal to or less than the predetermined amount based on a detection signal from the sensor; in a case it is determined that the remaining amount of ink during image recording on the recording medium by the recording head is equal to or less than the predetermined amount, integrate a discharge amount of ink from the nozzle in accordance with the image recording after the controller determines that the remaining amount of ink is equal to or less than the predetermined amount; store in the memory an integrated value of the discharge amount of ink from the nozzle that is integrated in the integration of the discharge amount of ink; and determine whether a calculated ink remaining amount is equal to or less than a threshold, the calculated ink remaining amount being a remaining amount of ink calculated using the integrated value stored in the memory, the threshold being smaller than the predetermined amount. In the determining of the remaining amount of ink, in a case it is determined that the remaining amount of ink at the time of receiving a recording start instruction to start the image recording on one recording medium is equal to or less than the predetermined amount, the controller is configured to: compare the calculated ink remaining amount with a required ink amount, the required ink amount being an amount of ink required for the image recording according to the recording start instruction; and in a case it is determined in the comparing that the calculated ink remaining amount is less than the required ink amount, not to start the image recording according to the recording start instruction. In the determining of the remaining amount of ink, in a case it is determined that the remaining amount of ink at the time of receiving the recording start instruction is not equal to or less than the predetermined amount, the controller is configured to: start the image recording according to the recording start instruction; and during the image recording according to the recording start instruction, in a case it is determined that the remaining amount of ink is equal to or less than the predetermined amount and that the calculated ink remaining amount is equal to or less than the threshold, interrupt the image recording according to the recording start instruction.

In a case where the calculated ink remaining amount is less than a required ink amount, when image recording is started, ink runs out in the middle of recording an image on one recording medium. According to the image recording apparatus of the present disclosure, when the remaining amount of ink at the time of receiving a recording start instruction is equal to or less than a predetermined amount and the calculated ink remaining amount is less than a required ink amount, image recording is not started. Therefore, it is possible to prevent a situation in which ink runs out in the middle of recording an image on one recording medium. On the other hand, in a case where the remaining amount of ink is not equal to or less than the predetermined amount, even if ink runs out in the middle of image recording according to the recording start instruction, when a user is allowed to replace a new ink cartridge before the start of recording, a large amount of ink is wasted. According to the image recording apparatus of the present disclosure, when the remaining amount of ink at the time of receiving the recording start instruction is not equal to or less than the predetermined amount, image recording is started regardless of whether ink runs out in the middle of image recording according to the recording start instruction. Therefore, waste of ink can be reduced.

FIGS. 4A and 4B shows information to be displayed on a display, in which FIG. 4A shows first ink remaining amount information and FIG. 4B shows second ink remaining amount information.

A printer 100 (corresponding to an "image recording apparatus" of the present disclosure) according to a preferred embodiment of the present disclosure will be described below with reference to FIGS. 1 to 3. An upper-lower direction, a front-rear direction, and a left-right direction shown in FIG. 1 are referred to as an upper-lower direction, a front-rear direction, and a left-right direction of the printer 100.

Figure 1:
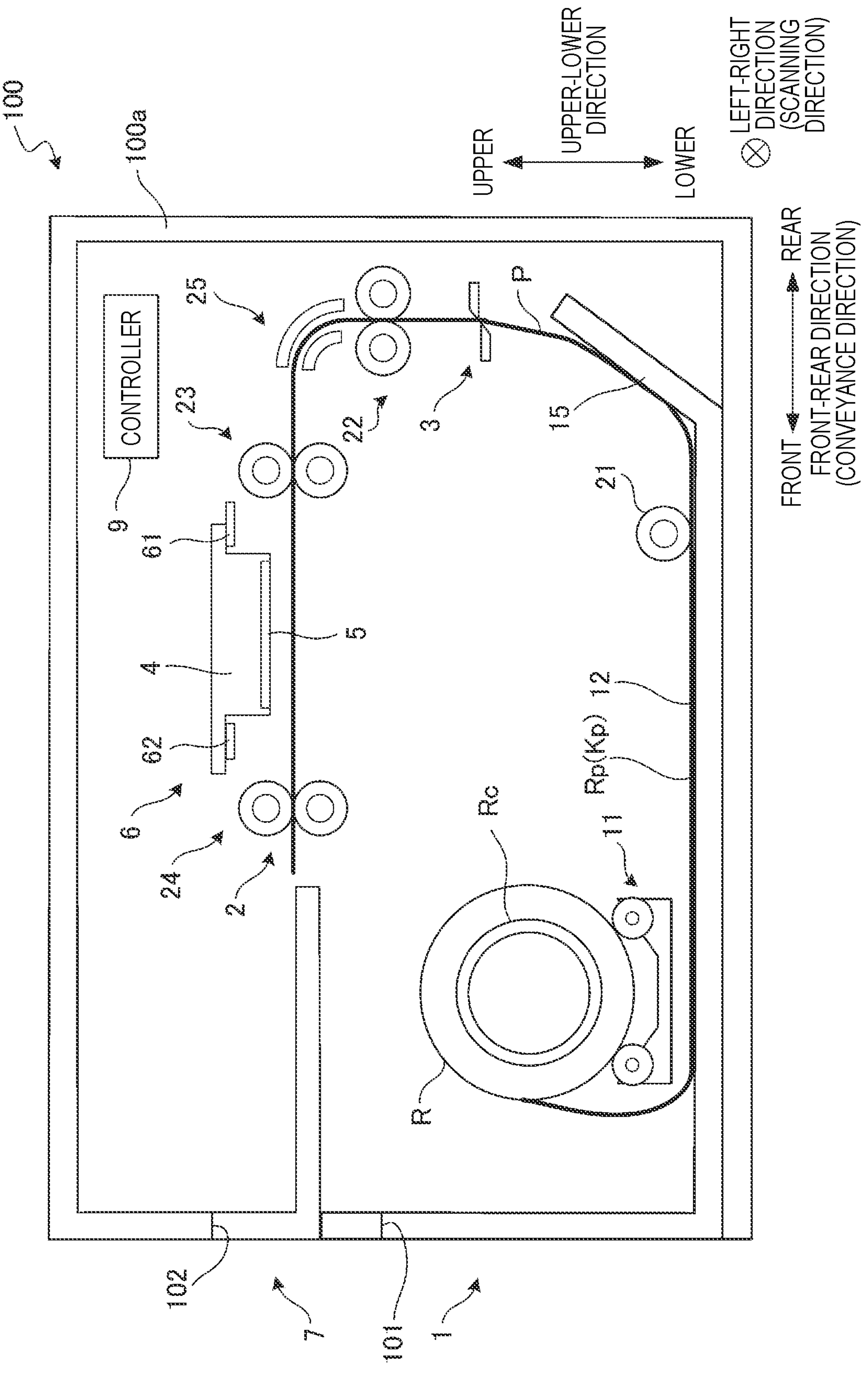
FIG. 1 is a schematic side view showing an internal structure of a printer according to an embodiment of the present disclosure.
Figure 2:
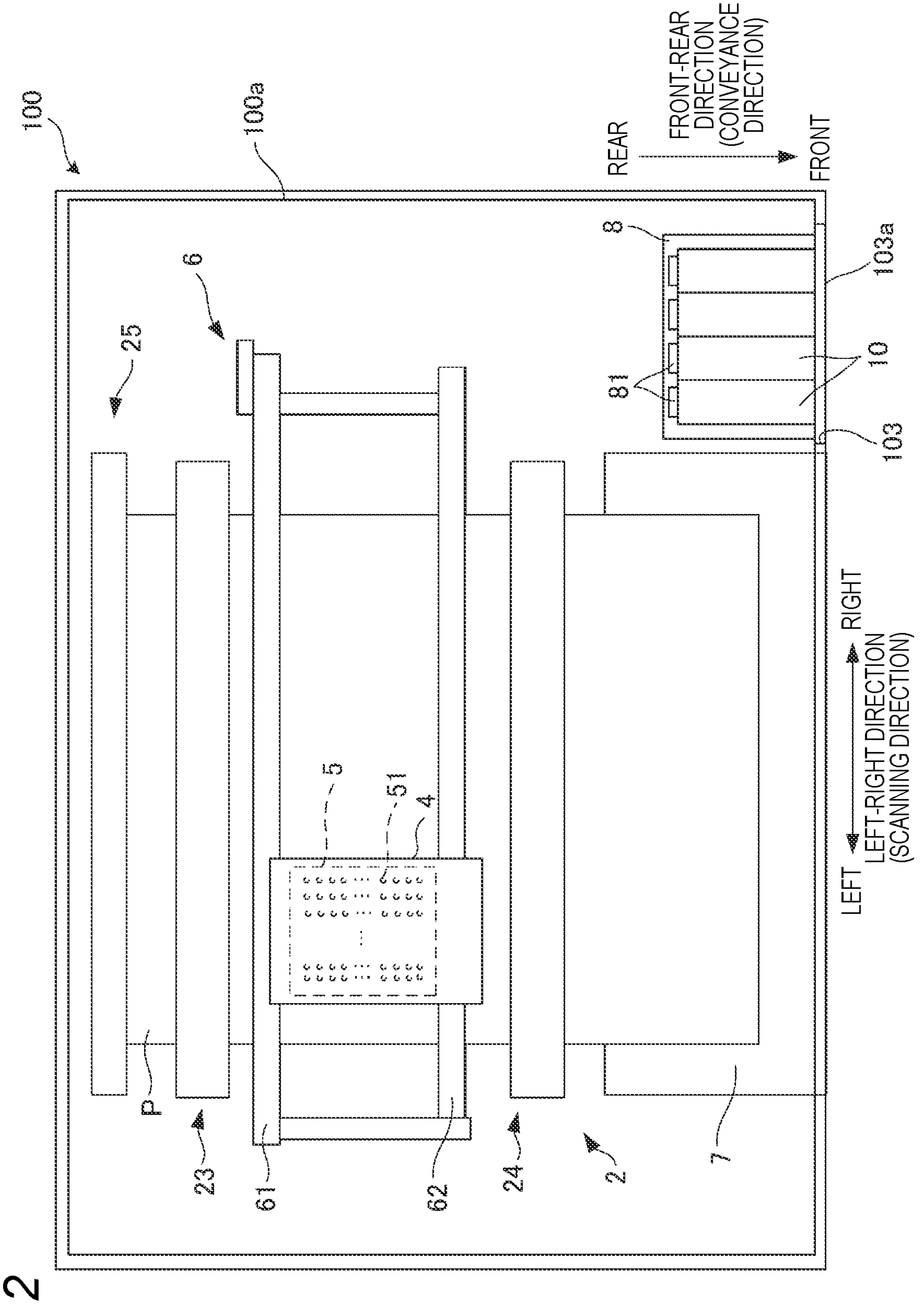
FIG. 2 is a schematic plan view showing the printer shown in FIG. 1.

As shown in FIGS. 1 and 2, the printer 100 mainly includes a housing 100*a*, a feed tray 1, a conveyance mechanism 2, a cutter 3, a carriage 4, a head 5, a movement mechanism 6, a discharge tray 7, a cartridge installation portion 8, and a controller 9.

The feed tray 1 is disposed below the head 5 in the housing 100*a*. The feed tray 1 is insertable into and removable from the housing 100*a* along the front-rear direction through an opening 101 that is formed in a front wall of the housing 100*a*.

The feed tray 1 can accommodate a roll body R and a cut sheet Kp. The cut sheet Kp is one example of a recording medium. The recording medium may include a cut paper. The feed tray 1 may simultaneously accommodate the roll body R and the cut sheet Kp, or may selectively accommodate any one of the roll body R and the cut sheet Kp. The feed tray 1 includes a roll body support portion 11 that supports the roll body R, and a placement surface 12 on which the cut sheet Kp is placed.

The roll body R is formed by rolling a long sheet into a roll shape around an outer peripheral surface of a cylindrical core member Rc. Incidentally, the roll body R may be formed by rolling the long sheet into the roll shape, without using the core member Rc. The cut sheet Kp is a sheet shorter than the long sheet for forming the roll body R, and is, for example, a sheet of a standard size such as an A4 size or a B5 size. A maximum size of the cut sheet Kp that can be used in the printer 100 according to the present embodiment is a sheet of A4 size.

The conveyance mechanism 2 includes a feed roller 21, an intermediate roller pair 22, a conveyance roller pair 23, a discharge roller pair 24, and a guide member 25.

The feed roller 21 feeds a roll sheet Rp unrolled from the roll body R that is supported by the roll body support portion 11 or the cut sheet Kp placed on the placement surface 12 from the feed tray 1. In the following description, when the roll sheet Rp and the cut sheet Kp are not distinguished from each other, the roll sheet Rp and the cut sheet Kp are referred to as a "sheet P".

Figure 3:
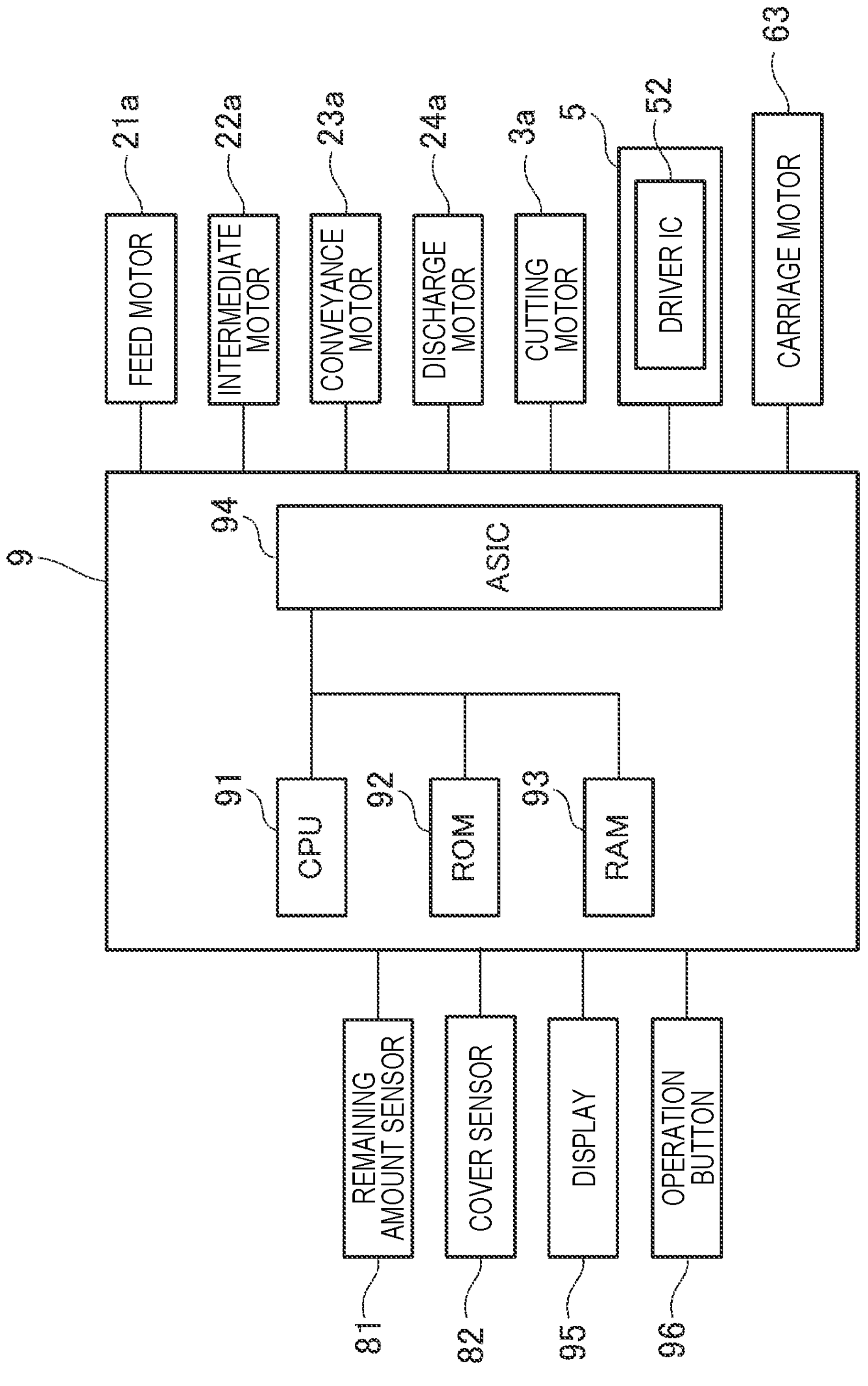
FIG. 3 is a block diagram showing an electrical configuration of the printer shown in FIG. 1.

The feed roller 21 is rotated by driving of a feed motor 21*a* (see FIG. 3). When the feed motor 21*a* is driven under the control of the controller 9, the feed roller 21 is rotated, and a conveying force in a direction from a front side to a rear side is applied to the sheet P in contact with the feed roller 21. As a result, the sheet P is fed from the feed tray 1. A rear wall 15 provided at a rear end portion of the feed tray 1 is inclined such that an upper end portion of the rear wall 15 is located rearward of a lower end portion of the rear wall 15. Therefore, the sheet P fed from the feed tray 1 is directed obliquely upward.

The intermediate roller pair 22 includes a drive roller that is rotated by driving of an intermediate motor 22*a* (see FIG. 3) and a driven roller that is rotated by the drive roller. When the intermediate motor 22*a* is driven under the control of the controller 9, the intermediate roller pair 22 is rotated while holding the sheet P so as to convey the sheet P. The intermediate roller pair 22 is located above a rear end portion of the feed tray 1. The intermediate roller pair 22 holds and conveys upward the sheet P that is fed from the feed tray 1 by the feed roller 21 and is directed obliquely upward. The guide member 25 is located above the intermediate roller pair 22. The guide member 25 guides forward the sheet P that is conveyed upward by the intermediate roller pair 22.

The conveyance roller pair 23 includes a drive roller that is rotated by driving of a conveyance motor 23*a* (see FIG. 3) and a driven roller that is rotated by the drive roller. The discharge roller pair 24 includes a drive roller that is rotated by driving of a discharge motor 24*a* (see FIG. 3) and a driven roller that is rotated by the drive roller. When the conveyance motor 23*a* and the discharge motor 24*a* are driven under the control of the controller 9, the conveyance roller pair 23 and the discharge roller pair 24 are rotated while holding the sheet P so as to convey the sheet P. The conveyance roller pair 23 is located in the rear of the head 5, and the discharge roller pair 24 is located in front of the head 5. The conveyance roller pair 23 conveys forward the sheet P that is guided forward by the guide member 25. The discharge roller pair 24 holds and conveys forward the sheet P that is conveyed forward by the conveyance roller pair 23, and discharges the sheet P to the discharge tray 7.

The cutter 3 is located between a rear end portion of the feed tray 1 and the intermediate roller pair 22. The cutter 3 includes, for example, a disk-shaped rotary blade and a disk-shaped driven blade. The rotary blade of the cutter 3 is rotated by driving of a cutting motor 3*a* (see FIG. 3), and the cutter 3 reciprocates along the left-right direction. The roll sheet Rp unrolled from the roll body R is cut in a width direction of the roll sheet Rp by the cutter 3 when the cutting motor 3*a* is driven under the control of the controller 9.

The head 5 (corresponding to a "recording head" or a "recording unit" of the present disclosure) includes a plurality of nozzles 51 (see FIG. 2) formed on a lower surface of the head 5 and a driver IC 52 (see FIG. 3). When the driver IC 52 is driven under the control of the controller 9, ink is discharged from the nozzles 51, and an image is recorded on the sheet P when the sheet P conveyed by the conveyance mechanism 2 passes through an image recording position facing the lower surface of the head 5. The head 5 is mounted on the carriage 4.

The movement mechanism 6 includes two guide rails 61 and 62 and a carriage motor 63 (see FIG. 3). The two guide rails 61 and 62 are separated from each other in the front-rear direction and extend in the left-right direction. The carriage 4 is disposed in a manner of straddling the two guide rails 61 and 62. The carriage 4 is connected to the carriage motor 63 via a belt (not shown) or the like. When the carriage motor 63 is driven under the control of the controller 9, the carriage 4 moves in the left-right direction (a scanning direction) along the guide rails 61 and 62.

The discharge tray 7 is disposed in front of the head 5 in the housing 100*a* and is disposed above the feed tray 1. The discharge tray 7 is insertable into and removable from the housing 100*a* along the front-rear direction through an opening 102 that is formed in a front wall of the housing 100*a*. The sheet P on which an image was recorded by the head 5 is received by the discharge tray 7.

As shown in FIG. 2, the cartridge installation portion 8 is provided at one side (right side) of the discharge tray 7 in a left-right running direction and at a front side of the movement mechanism 6 in the front-rear direction. Four ink cartridges 10 that store ink of colors of black, yellow, cyan, and magenta, respectively, can be removably installable in the cartridge installation portion 8. Ink is supplied to the head 5 from the ink cartridges 10 installed in the cartridge installation portion 8 through a tube (not shown) or the like.

An opening 103 is formed at a position facing the cartridge installation portion 8 at a front surface side (a lower side in FIG. 2) of the housing 100*a*. A cover 103*a* covering the opening 103 is attached to the housing 100*a*. The cover 103*a* can move to a covering position where the cover 103*a* covers the opening 103 and an opening position where the cover 103*a* opens the opening 103. When the cover 103*a* is moved from the covering position to the opening position, the ink cartridge 10 installed in the cartridge installation portion 8 can be replaced.

The cartridge installation portion 8 is attached with a remaining amount sensor 81. The remaining amount sensor 81 is configured to detect whether a remaining amount of ink in the installed ink cartridge 10 is equal to or less than a predetermined amount M. The remaining amount sensor 81 is, for example, an optical sensor of a light emitting type or a light transmitting type having a light emitting element and a light receiving element. The ink cartridge 10 is formed of a light transmitting material. For example, the remaining amount sensor 81 detects whether a remaining amount of ink is equal to or less than the predetermined amount M by detecting a liquid level position of ink in the ink cartridge 10. The remaining amount sensor 81 is provided for each of the four ink cartridges 10.

A cover sensor 82 (see FIG. 3) is attached to the cartridge installation portion 8. The cover sensor 82 outputs different detection signals when the cover 103*a* is at the covering position where the cover 103*a* covers the opening 103 and when the cover 103*a* is at the opening position where the cover 103*a* opens the opening 103.

Here, an example of the ink cartridge 10 will be described. In the present embodiment, it is assumed that the ink cartridge 10 has a relatively small capacity. Specifically, a capacity of the black ink cartridge 10 is 10 ml, and a capacity of the color ink cartridge 10 is 5 ml. The predetermined amount M used as a detection reference of the remaining amount sensor 81 is 1.7 ml for the black ink cartridge 10 and 0.6 ml for the color ink cartridge 10. As will be described later, when an image is recorded on the roll sheet Rp of a size larger than an A4 size, 2.8 ml of ink may be required for recording one image. Therefore, before the remaining amount sensor 81 detects that the remaining amount of ink is equal to or less than the predetermined amount M, ink may run out in the middle of recording an image on one sheet P.

As will be described in detail later, the controller 9 calculates a remaining amount of ink in the ink cartridge 10 based on an integrated value of an amount of ink discharged from the nozzles 51 after it is detected that the remaining amount of ink is equal to or less than the predetermined amount M. Further, it is determined whether a calculated ink remaining amount C is equal to or less than a threshold T. The threshold Tis 1.5 ml for the black ink cartridge 10 and 0.5 ml for the color ink cartridge 10. Here, as will be described later, an amount of ink required for solid printing on a sheet P of A4 size is 0.49 ml. Therefore, in a case where the calculated ink remaining amount C is not equal to or less than the threshold T before the start of the image recording on a sheet P of A4 size, even when the remaining amount of ink falls below the threshold T in the middle of the image recording, ink does not run out in the middle of recording an image on one sheet P of A4 size.

The controller 9 controls the entire printer 100. As shown in FIG. 3, the controller 9 is electrically connected to the feed motor 21*a*, the intermediate motor 22*a*, the conveyance motor 23*a*, the discharge motor 24*a*, the cutting motor 3*a*, the driver IC 52, the carriage motor 63, the remaining amount sensor 81, the cover sensor 82, a display 95, an operation button 96, and the like.

The display 95 and the operation button 96 are provided on an outer surface of the housing 100*a*. The display 95 displays various kinds of information related to the printer 100 to notify a user, and corresponds to a "notification unit" of the present disclosure. The notification unit may be a speaker. The operation button 96 receives an instruction input from a user, and corresponds to a "user interface" or a "reception unit" of the present disclosure. The user interface may be a touch panel, a keyboard, a mouse, or the like.

As shown in FIG. 3, the controller 9 includes a central processing unit (CPU) 91, a read only memory (ROM) 92, a random access memory (RAM) 93, an application specific integrated circuit (ASIC) 94, and the like. The ROM 92 stores programs to be executed by the CPU 91 and the ASIC 94, various kinds of fixed data, and the like. The RAM 93 temporarily stores data (image data and the like) necessary for executing a program, and corresponds to a "memory" of the present disclosure.

In the controller 9, only the CPU 91 may perform various processing, only the ASIC 94 may perform various processing, or the CPU 91 and the ASIC 94 may cooperate with each other to perform various processing. The controller 9 may be configured such that one CPU 91 independently performs a processing, or may be configured such that a plurality of CPUs 91 share processing. The controller 9 may be configured such that one ASIC 94 independently performs a processing, or may be configured such that a plurality of ASICs 94 share processing.

The controller 9 controls to record an image on the sheet P based on a recording instruction transmitted from an external device (for example, a PC or a smartphone) by a user. The image recording is performed by performing a conveyance processing of conveying a sheet P in a conveyance direction by a predetermined distance by the conveyance mechanism 2, and a scanning processing of discharging ink from the plurality of nozzles 51 of the head 5 while moving the carriage 4 in the scanning direction by the movement mechanism 6.

The controller 9 receives a recording start instruction to start to record an image on one sheet P. When the recording instruction transmitted from a user instructs to record an image on a plurality of sheets P, the controller 9 receives a subsequent recording start instruction after the image recording on one sheet P is completed. The recording start instruction includes information related to a size of a sheet P on which image recording is to be performed.

The controller 9 can calculate a required ink amount N that is an amount of ink required for image recording according to the recording start instruction based on the information related to the size of a sheet P included in the recording start instruction. In the present embodiment, the required ink amount N is calculated based on a ratio of an area of a sheet P of a standard size to an area of a sheet P related to the recording start instruction. That is, for example, it is assumed that the ROM 92 stores 0.49 ml of ink required for solid printing on a sheep P of A4 size. The recording start instruction instructs to perform image recording on the roll sheet Rp, and a size of the sheet P (the roll sheet Rp) is 297 mm in width and 1200 mm in length. In this case, an area (width 297 mm×length 1,200 mm=356,400 $mm^2$) of the sheet P related to the recording start instruction is about 5.7 times an area (width 297 mm×length 210 mm=62,370 $mm^2$) of the sheet P of A4 size. Therefore, the required ink amount N is set to be about 2.8 ml which is 5.7 times the amount (0.49 ml) of ink required to be applied to a sheep P of A4 size.

The required ink amount N may be calculated based on a maximum amount of ink discharged per unit area (1 $in^2$). For example, a maximum amount of ink discharged per unit area is 0.005 ml. When the size of the sheet P related to the recording start instruction is the same as that described above, an area of the sheet P related to the recording start instruction is about 552.4 $in^2$. Therefore, the required ink amount N is set to about 2.8 ml by multiplying 552.4 $in^2$ by the maximum amount (0.005 ml) of ink discharged per unit area.

Further, the required ink amount N may be calculated based on a recording resolution of the printer 100. For example, a resolution in the scanning direction (the width direction of the sheet P) is 600 dpi, and a resolution in the conveyance direction (the length direction of the sheet P) is 300 dpi. An amount of ink per dot is 0.000000028 ml. When the size of the sheet P related to the recording start instruction is the same as that described above, the number of dots formed in the width direction of the sheet P related to the recording start instruction is about 7015.7, and the number of dots formed in the length direction of the sheet P related to the recording start instruction is about 14173.2. Therefore, the required ink amount N is set to about 2.8 ml by multiplying a total number of dots (7015.7×14173.2) formed on the sheet P related to the recording start instruction by an ink amount per dot (0.000000028 ml).

The ROM 92 may store a table in which a plurality of sizes of a sheet P are associated with ink amounts required for image recording, and the required ink amount N may be obtained with reference to the table. Further, an amount of ink discharged from the nozzles 51 in a case of recording an image based on image data of image recording according to the recording start instruction may be calculated based on the image data, and may be set as the required ink amount N.

The controller 9 performs a sheet size determination processing of determining whether a size of the sheet P in the image recording according to the recording start instruction is a size (that is, the roll sheet Rp) larger than A4 size which is a maximum size of the cut sheet Kp based on information related to the size of the sheet P included in the recording start instruction.

Further, the controller 9 performs a detected remaining amount determination processing of determining whether a remaining amount of ink in the ink cartridge 10 installed in the cartridge installation portion 8 is equal to or less than the predetermined amount M, based on a detection signal from the remaining amount sensor 81.

When the controller 9 determines that the remaining amount of ink is equal to or less than the predetermined amount M during the image recording on the sheet P by the head 5 in the detected remaining amount determination processing, the controller 9 performs a discharge amount integration processing of integrating a discharge amount of ink from the nozzles 51 in accordance with the image recording after the controller 9 determines that the remaining amount of ink is equal to or less than the predetermined amount M. The discharge amount of ink from the nozzles 51 is calculated, for example, by counting the number of discharge times of ink from the nozzles 51 and multiplying the number of discharge times by an amount of ink discharged at one time. When the amount of ink discharged at one time is variable, the amount of ink discharged at one time is calculated using an average value or the like.

Further, the controller 9 performs an integrated value storing processing of storing, in the RAM 93, an integrated value V of the discharge amount of ink from the nozzles 51 that was integrated in the discharge amount integration processing. The controller 9 adds an amount of ink discharged from the nozzles 51 to the integrated value V stored in the RAM 93 each time the scanning processing is performed once. When the controller 9 detects that the ink cartridge 10 was replaced by a method to be described below, the controller 9 resets the integrated value V stored in the RAM 93.

In addition, the controller 9 calculates a remaining amount of ink (calculated ink remaining amount C) in the ink cartridge 10 using the integrated value V stored in the RAM 93. Since the integrated value V is a discharge amount of ink after the remaining amount of ink reaches the predetermined amount M, the remaining amount of ink in the ink cartridge 10 can be calculated by subtracting the integrated value V from the predetermined amount M. That is, the calculated ink remaining amount C=the predetermined amount M−the integrated value V. Then, the controller 9 performs a calculated remaining amount determination processing of determining whether the calculated ink remaining amount C is equal to or less than the threshold T that is less than the predetermined amount M.

When the controller 9 determines that the size of the sheet P in the image recording is a large size, which is the size larger than the standard size, in the sheet size determination processing, the controller 9 determines whether a remaining amount of ink at the time of receiving the recording start instruction is equal to or less than the predetermined amount M in the detected remaining amount determination processing.

Further, when the controller 9 determines that the remaining amount of ink at the time of receiving the recording instruction is equal to or less than the predetermined amount M in the detected remaining amount determination processing, the controller 9 performs an ink amount comparison processing of comparing the calculated remaining amount of ink C with the required ink amount N which is an amount of ink required to recording an image according to the recording start instruction. In the ink amount comparison processing, when the calculated ink remaining amount C is less than the required ink amount N, the image recording according to the recording start instruction is not started until the ink cartridge 10 is replaced. In the ink amount comparison processing, when the calculated ink remaining amount C is equal to or larger than the required ink amount N, the image recording according to the recording start instruction is started.

When the controller 9 determines that a remaining amount of ink at the time of receiving the recording start instruction is not equal to or less than the predetermined amount M in the detected remaining amount determination processing, the controller 9 starts to record an image according to the recording start instruction. When it is determined that a remaining amount of ink is equal to or less than the predetermined amount M in the detected remaining amount determination processing and it is determined that the calculated ink remaining amount C is equal to or less than the threshold T in the calculated remaining amount determination processing during image recording according to the recording start instruction, the controller 9 performs a recording interruption processing of interrupting the image recording according to the recording start instruction.

Further, when it is determined that the size of the sheet P in the image recording is not the large size in the sheet size determination processing, the controller 9 starts to record an image according to the recording start instruction. When it is determined that a remaining amount of ink is equal to or less than the predetermined amount M in the detected remaining amount determination processing and it is determined that the calculated remaining amount of ink C is equal to or less than the threshold T in the calculated remaining amount determination processing during the image recording according to the recording start instruction, after image recording on one sheet P according to the recording start instruction is completed, the controller 9 does not start image recording according to a subsequent recording start instruction until the ink cartridge 10 is replaced.

Figure 4A:
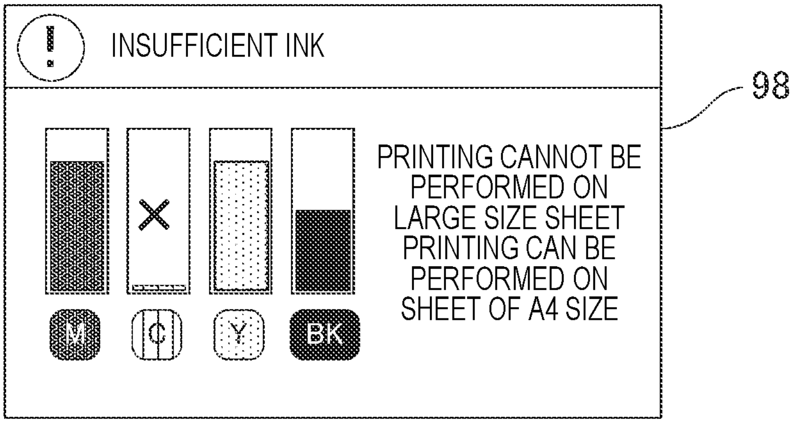

When the calculated ink remaining amount C is less than the required ink amount N in the ink amount comparison processing, the controller 9 performs a first notification processing of displaying first ink remaining amount information 98 indicating that a remaining amount of ink is insufficient on the display 95, as shown in FIG. 4A. The first ink remaining amount information 98 includes a message indicating that "printing cannot be performed on a large size sheet". That is, the first ink remaining amount information 98 includes information indicating that a remaining amount of ink is insufficient for performing image recording (that is, image recording on a large size sheet P) according to the recording start instruction. In addition, the first ink remaining amount information 98 includes a message indicating that "printing can be performed on a sheet of A4 size". That is, the first ink remaining amount information 98 includes information indicating that image recording on a sheet P of a size (that is, a sheet P of A4 size) smaller than the sheet P in the image recording according to the recording start instruction can be executed.

After the controller 9 performs the first notification processing, when the operation button 96 receives an instruction to cancel the recording start instruction (a cancel instruction), the controller 9 controls the display 95 to end the display of the first ink remaining amount information 98.

Figure 4B:
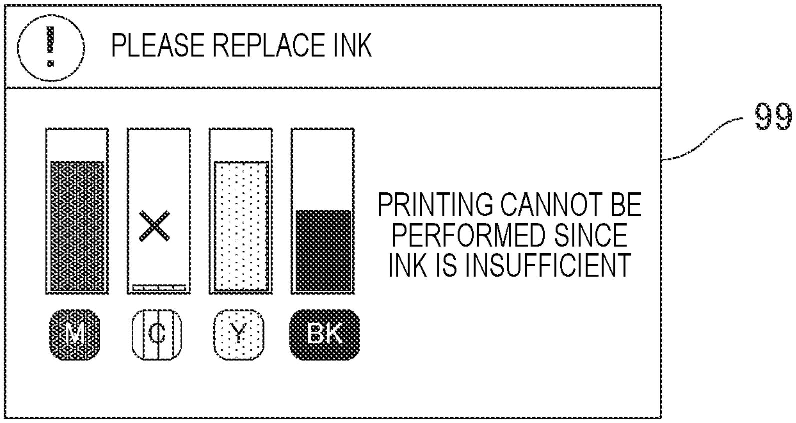

When the controller 9 performs the recording interruption processing, the controller 9 performs a second notification processing of displaying second ink remaining amount information 99 indicating that a remaining amount of ink is insufficient on the display 95, as shown in FIG. 4B. After the controller 9 performs the second notification processing, when the operation button 96 receives the cancel instruction, the controller 9 controls the display 95 so as to continue the display of the second ink remaining amount information 99.

The controller 9 detects whether the ink cartridge 10 installed in the cartridge installation portion 8 is replaced based on detection signals from the remaining amount sensor 81 and the cover sensor 82. Specifically, when the detection signal from the remaining amount sensors 81 corresponding to all of the ink cartridges 10 indicate that a remaining amount of ink is larger than the predetermined amount M and the detection signal from the cover sensor 82 indicates that the cover 103*a* is at the covering position where the cover 103*a* covers the opening 103, the controller 9 detects that the ink cartridge 10 is replaced. That is, the remaining amount sensor 81 and the cover sensor 82 function as a "replacement detection unit" or "detector" of the present disclosure. The controller 9 may detect whether the ink cartridge 10 is replaced based on a detection signal from one of the remaining amount sensor 81 and the cover sensor 82.

Figure 5:
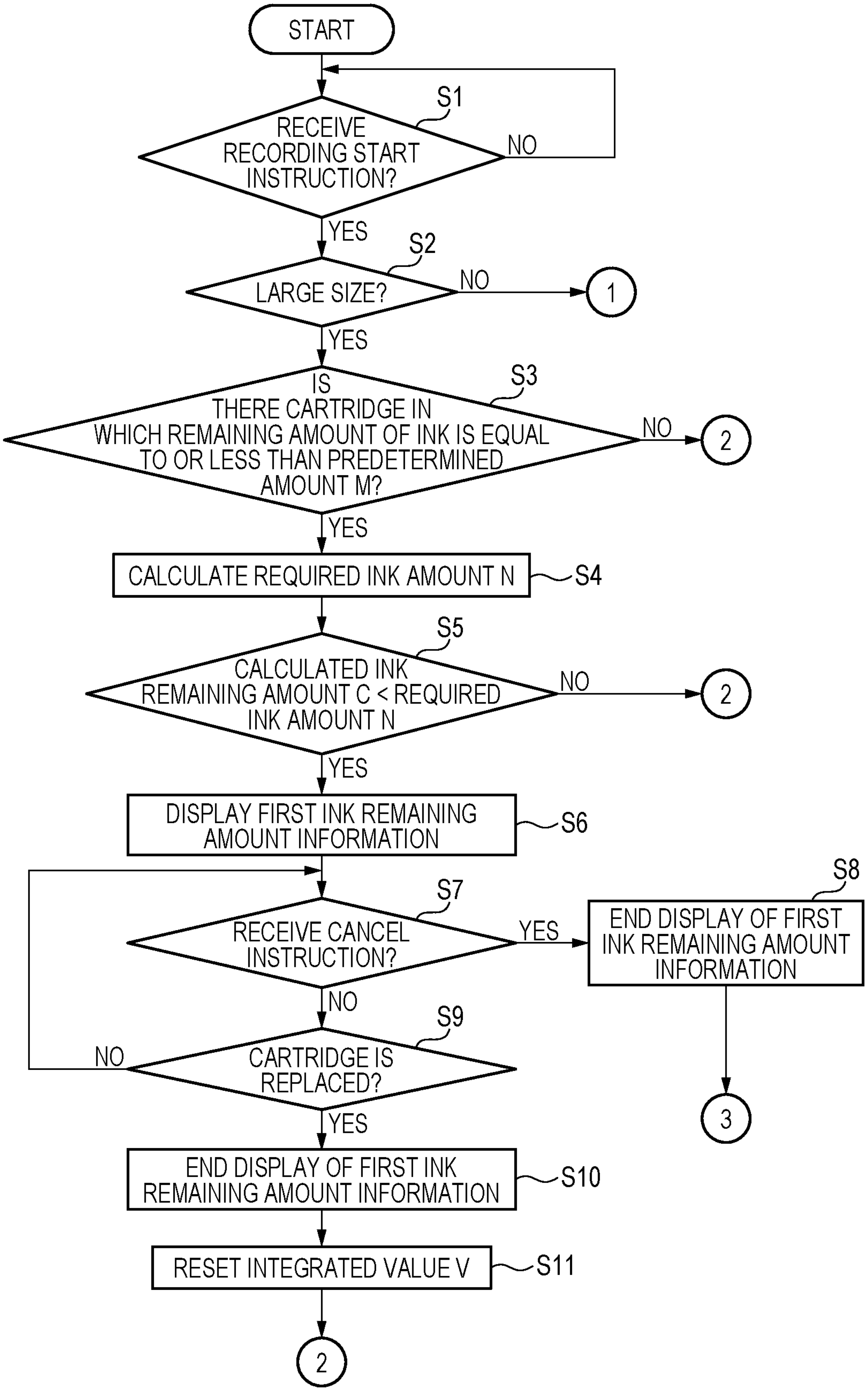
FIG. 5 is a first part of a flowchart showing an operation of the printer shown in FIG. 1.
Figure 6:
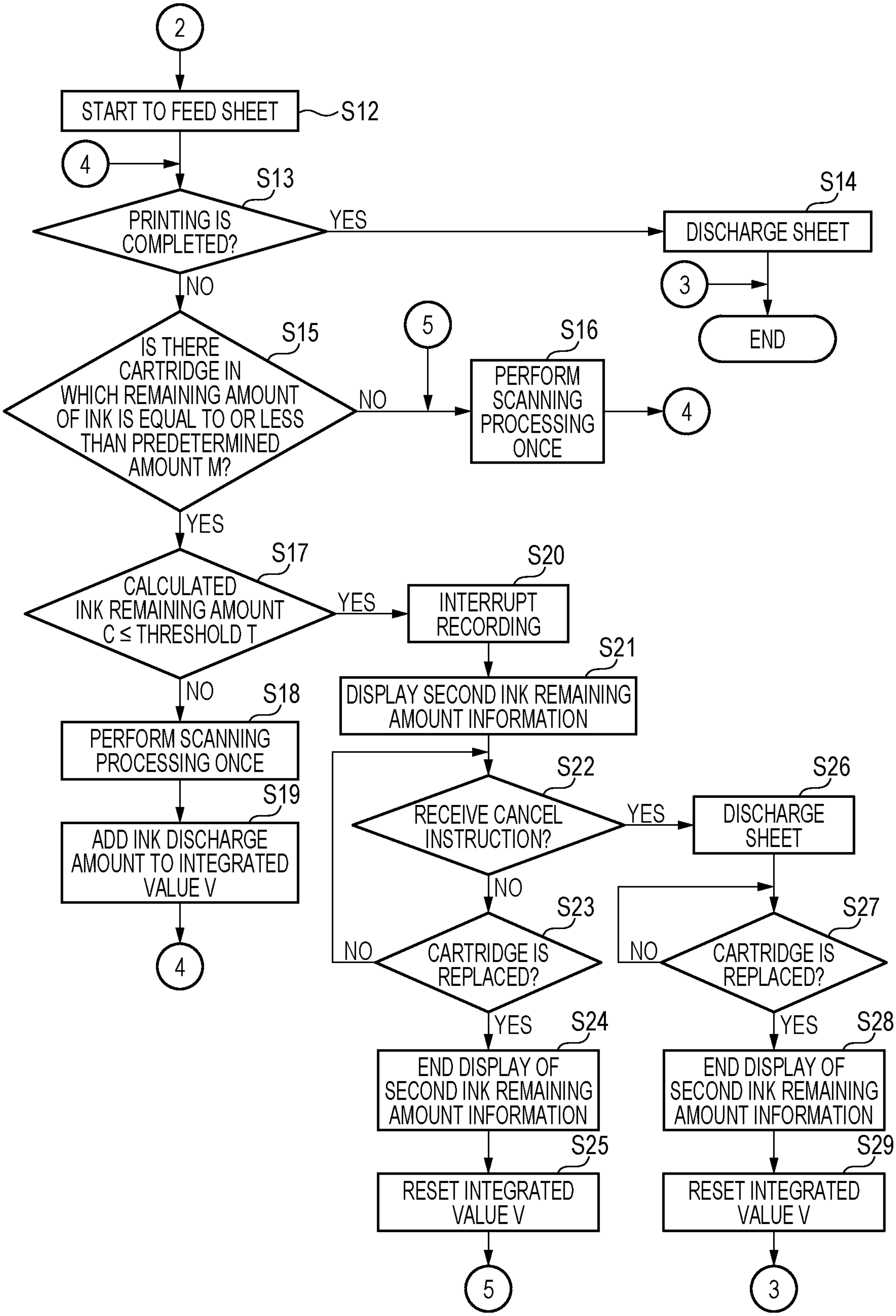
FIG. 6 is a second part of the flowchart showing the operation of the printer shown in FIG. 1.
Figure 7:
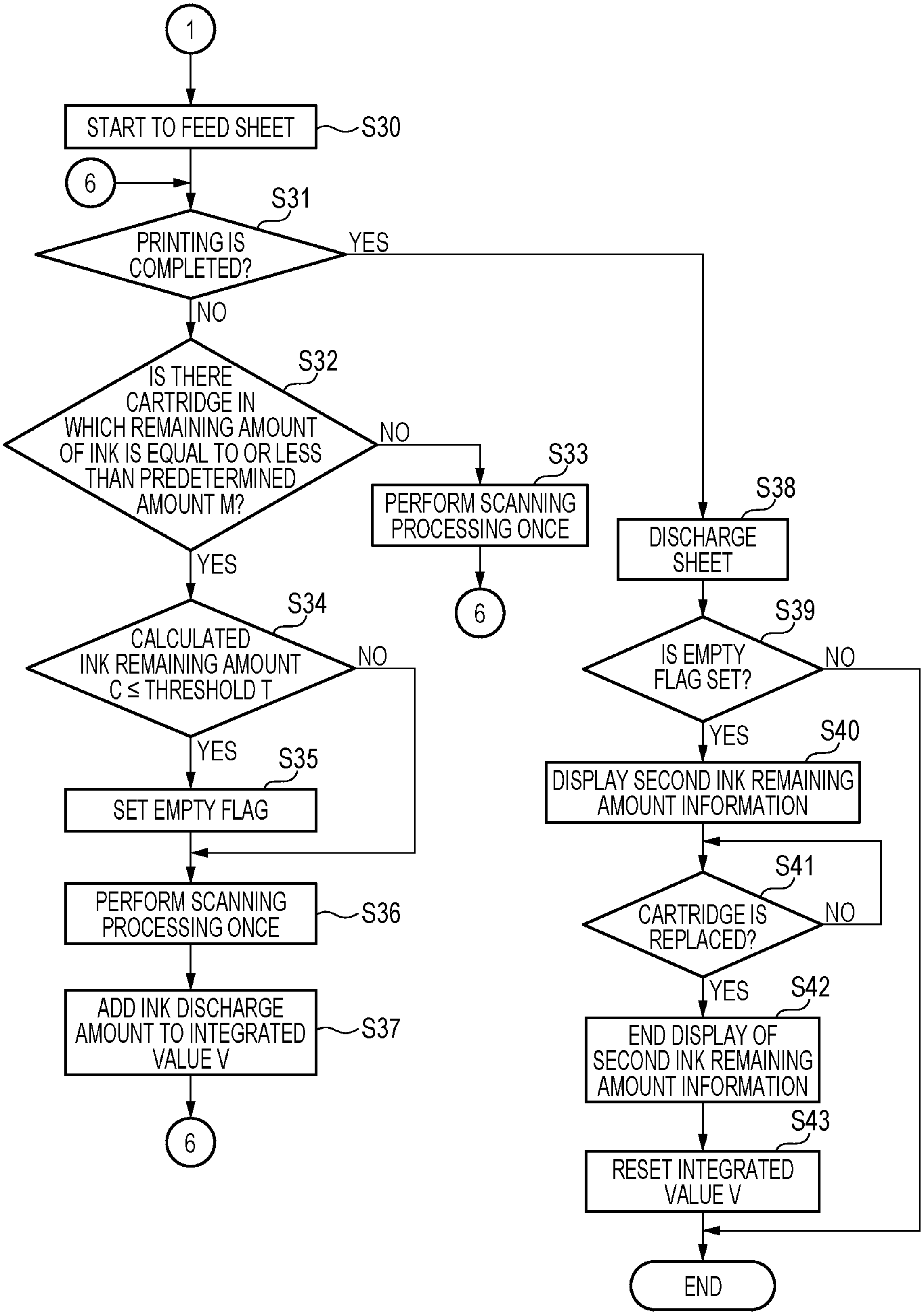
FIG. 7 is a third part of the flowchart showing the operation of the printer shown in FIG. 1.

Next, an example of an operation performed by the printer 100 will be described with reference to flowcharts in FIGS. 5 to 7.

First, the controller 9 determines whether a recording start instruction instructing to start image recording on one sheet P is received (S1). The determination in S1 is repeated until it is determined that the recording start instruction is received. When it is determined that the recording start instruction is received (S1: YES), the controller 9 determines whether the size of the sheet P in the image recording according to the recording start instruction is a size larger than the A4 size (S2). When it is determined that the size is not the large size (S2: NO), the processing proceeds to S26 which will be described later.

On the other hand, when it is determined that the size is the large size (S2: YES), the controller 9 determines whether the ink cartridge 10 corresponding to a color to be used in the image recording according to the recording start instruction has a remaining amount of ink equal to or less than the predetermined amount M (S3). When it is determined that there is no ink cartridge 10 in which the remaining amount of ink is equal to or less than the predetermined amount M (S3: NO), the processing proceeds to S12 which will be described later. When it is determined that there is the ink cartridge 10 in which the remaining amount of ink is equal to or less than the predetermined amount M (S3: YES), the controller 9 calculates a required ink amount N which is an amount of ink required for image recording according to the recording start instruction (S4).

Next, the controller 9 compares the calculated ink remaining amount C with the required ink amount N for the ink cartridge 10 in which the remaining amount of ink is equal to or less than the predetermined amount M, and determines whether the calculated ink remaining amount C is less than the required ink amount N (S5). When the calculated ink remaining amount C is not less than the required ink amount N (S5: NO), the processing proceeds to S12 which will be described later. When the calculated ink remaining amount C is less than the required ink amount N (S5: YES), the controller 9 displays the first ink remaining amount information 98 (see FIG. 4A) on the display 95 (S6).

Next, the controller 9 determines whether a cancel instruction instructing to cancel the recording start instruction is received (S7). When it is determined that the cancel instruction is received (S7: YES), the controller 9 ends the display of the first ink remaining amount information 98 (S8), and ends the processing. When it is determined that the cancel instruction is not received (S7: NO), the controller 9 determines whether the ink cartridge 10 is replaced (S9). When it is determined that the ink cartridge 10 is not replaced (S9: NO), the processing returns to S7.

On the other hand, when it is determined that the ink cartridge 10 is replaced (S9: YES), the controller 9 ends the display of the first ink remaining amount information 98 (S10). Further, the controller 9 resets the integrated value V stored in the RAM 93 (S11). Thereafter, the controller 9 starts to feed the sheet P from the feed tray 1 (S12) and starts image recording according to the recording start instruction, and determines whether the image recording according to the recording start instruction is completed (S13). When it is determined that the image recording is completed (S13: YES), the controller 9 discharges the sheet P on which an image is recorded to the discharge tray 7 (S14).

When it is determined that the image recording is not completed (S13: NO), the controller 9 determines whether the ink cartridge 10 corresponding to a color to be used in the image recording according to the recording start instruction has a remaining amount of ink equal to or less than the predetermined amount M (S15). When it is determined that there is no ink cartridge 10 in which the remaining amount of ink is equal to or less than the predetermined amount M (S15: NO), the controller 9 performs the scanning processing once (S16), and returns the processing to S13. On the other hand, when it is determined that there is the ink cartridge 10 in which the remaining amount of ink is equal to or less than the predetermined amount M (S15: YES), the controller 9 determines whether the calculated ink remaining amount C is equal to or less than the threshold T for the ink cartridge 10 in which the remaining amount of ink is equal to or less than the predetermined amount M (S17).

When it is determined that the calculated ink remaining amount C is not equal to or less than the threshold T (S17: NO), the controller 9 performs the scanning processing once (S18). Then, the controller 9 adds a discharge amount of ink from the nozzles 51 to the integrated value V stored in the RAM 93 in the scanning processing in S18 (S19), and returns the processing to S13. When it is determined that the calculated ink remaining amount C is equal to or less than the threshold T (S17: YES), the controller 9 interrupts the image recording according to the recording start instruction (S20). Then, the controller 9 displays the second ink remaining amount information 99 (see FIG. 4B) on the display 95 (S21). Next, the controller 9 determines whether a cancel instruction instructing to cancel the recording start instruction is received (S22).

When it is determined that the cancel instruction is not received (S22: NO), the controller 9 determines whether the ink cartridge 10 is replaced (S23). When it is determined that the ink cartridge 10 is not replaced (S23: NO), the processing returns to S22. When it is determined that the ink cartridge 10 is replaced (S23: YES), the controller 9 ends the display of the second ink remaining amount information 99 (S24). Further, the controller 9 resets the integrated value V stored in the RAM 93 (S25), and proceeds the processing to S16.

On the other hand, when it is determined that the cancel instruction is received (S22: YES), the controller 9 discharges the sheet P to the discharge tray 7 (S26). At this time, the controller 9 continues the display of the second ink remaining amount information 99 on the display 95. Further, the controller 9 determines whether the ink cartridge 10 is replaced (S27). The determination in S27 is repeated until it is determined that the ink cartridge 10 is replaced. When it is determined that the ink cartridge 10 is replaced (S27: YES), the controller 9 ends the display of the second ink remaining amount information 99 (S28). Further, the controller 9 resets the integrated value V stored in the RAM 93 (S29), and ends the processing.

Next, a processing (S30 to S43 in FIG. 7) in a case where it is determined in S2 that the size is not the large size will be described. The processing of S30 to S37 in this case are substantially the same as the processing of S12, S13, and S15 to S19 described above. That is, in S30 corresponding to S17 described above, when it is determined that the calculated ink remaining amount C is equal to or less than the threshold T (S34: YES), the controller 9 sets an empty flag (S35), then proceeds the processing to S36 corresponding to S18 described above, and performs the scanning processing once. Description of the processing of S30 to S37 will be omitted.

When it is determined in S31 that the image recording is completed (S31: YES), the controller 9 discharges the sheet P on which an image is recorded to the discharge tray 7 (S38). Further, the controller 9 determines whether the empty flag is set (S39). When it is determined that the empty flag is not set (S39: NO), the processing ends. When it is determined that the empty flag is set (S39: YES), the controller 9 displays the second ink remaining amount information 99 (see FIG. 4B) on the display 95 (S40).

Next, the controller 9 determines whether the ink cartridge 10 is replaced (S41). The determination in S41 is repeated until it is determined that the ink cartridge 10 is replaced. When it is determined that the ink cartridge 10 is replaced (S41: YES), the controller 9 ends the display of the second ink remaining amount information 99 (S42). Further, the controller 9 resets the integrated value V stored in the RAM 93 (S43), and ends the processing.

As described above, in the printer 100 according to the first embodiment, in a case where the controller 9 determines that the remaining amount of ink at the time of receiving the recording start instruction is equal to or less than the predetermined amount M, the controller 9 does not start image recording when the calculated remaining amount of ink C, which is calculated based on the integrated value V of the discharge amount of ink after the controller 9 determines that the remaining amount of ink is equal to or less than the predetermined amount M, is less than the required ink amount N required for image recording according to the recording start instruction. When the controller 9 determines that the remaining amount of ink at the time of receiving the recording start instruction is not equal to or less than the predetermined amount M, the controller 9 starts image recording, and when the controller 9 determines that the remaining amount of ink is equal to or less than the predetermined amount M and the calculated ink remaining amount C is equal to or less than the threshold T during image recording, the controller 9 interrupts the image recording.

In a case where the calculated ink remaining amount C is less than the required ink amount N, when image recording is started, ink runs out in the middle of recording an image on one sheet P. In the present embodiment, in a case where the remaining amount of ink at the time of receiving the recording start instruction is equal to or less than the predetermined amount M, when the calculated ink remaining amount C is less than the required ink amount N, the image recording is not started. Therefore, it is possible to reduce a situation in which ink runs out in the middle of recording an image on one sheet P. On the other hand, in a case where the remaining amount of ink is not equal to or less than the predetermined amount M, ink may run out in the middle of image recording according to the recording start instruction. When a user is allowed to replace the new ink cartridge 10 before the start of recording, a large amount of ink is wasted. In the present embodiment, when the remaining amount of ink at the time of receiving the recording start instruction is not equal to or less than the predetermined amount M, image recording is started regardless of whether ink runs out in the middle of image recording according to the recording start instruction. Therefore, waste of ink can be reduced.

In the printer 100 according to the embodiment described above, the controller 9 starts image recording when the calculated ink remaining amount C is equal to or larger than the required ink amount N. Image recording is started when the calculated ink remaining amount C is equal to or larger than the required ink amount N, so that image recording on one sheet P can be completed in a manner of preventing a situation in which ink runs out in the middle of image recording.

Further, in the printer 100 according to embodiment described above, when the size of the sheet P related to the recording start instruction is a size larger than the A4 size, the controller 9 determines whether the remaining amount of ink at the time of receiving the recording start instruction is equal to or less than the predetermined amount M. In a case where the size of the sheet P is equal to or smaller than the A4 size, even if the remaining amount of ink is equal to or smaller than the predetermined amount M, when the remaining amount of ink is equal to or larger than the threshold T, ink does not run out in the middle of recording an image on one sheet P. Therefore, the determination for determining whether the remaining amount of ink at the time of receiving the recording start instruction is equal to or less than the predetermined amount M is performed only when the size of the sheet P is the large size, and thus the processing can be simplified.

In addition, in the printer 100 according to the embodiment described above, the controller 9 starts image recording when the sheet P related to the recording start instruction is not the large size. When it is determined that the remaining amount of ink is equal to or less than the predetermined amount M and the calculated ink remaining amount C is equal to or less than the threshold T during image recording, after the image recording on one sheet P related to the recording start instruction is completed, the controller 9 does not start image recording according to a subsequent recording start instruction. In a case where a size of the sheet P is not the large size, even when the remaining amount of ink is equal to or less than the threshold T during image recording, ink does not run out in the middle of recording an image on one sheet P. Therefore, it is possible to complete the image recording on the sheet P during image recording. Since image recording according to a subsequent recording start instruction is not started, it is possible to allow a user to replace the ink cartridge 10.

In the printer 100 according to the embodiment described above, the controller 9 resets the integrated value V stored in the RAM 93 when it is detected that the ink cartridge 10 is replaced. As a result, the remaining amount of ink in the replaced ink cartridge 10 can be calculated.

Further, in the printer 100 according to the embodiment described above, when the calculated ink remaining amount C is less than the required ink amount N, the controller 9 displays the first ink remaining amount information 98 on the display 95, and the first ink remaining amount information 98 includes information indicating that the remaining amount of ink is insufficient for performing image recording according to the recording start instruction, and information indicating that image recording on a sheet P having a size smaller than the sheet P in the image recording according to the recording start instruction can be performed. Therefore, it is possible to notify a user that the remaining amount of ink is insufficient to perform image recording according to the recording start instruction and that image recording on a recording medium of a small size can be performed.

In the printer 100 according to the embodiment described above, after the first ink remaining amount information 98 is displayed on the display 95, the controller 9 ends the display of the first ink remaining amount information 98 when the operation button 96 receives an instruction to cancel the recording start instruction. In this manner, since the controller 9 ends the display of the first ink remaining amount information 98 when the recording start instruction is cancelled, it is easy for a user to understand that image recording according to a subsequent recording start instruction to be received can be executed.

In the printer 100 according to the embodiment described above, when the controller 9 interrupts image recording, the controller 9 displays the second ink remaining amount information 99 indicating that a remaining amount of ink is insufficient on the display 95. Therefore, it is possible to notify a user that a remaining amount of ink is insufficient.

In the printer 100 according to the embodiment described above, after the second ink remaining amount information 99 is displayed on the display 95, when the operation button 96 receives an instruction to cancel the recording start instruction, the controller 9 controls the display 95 to continue the display of the second ink remaining amount information 99. In a case where the second ink remaining amount information 99 is displayed, since a remaining amount of ink is equal to or less than the threshold T, even when another recording start instruction is received after the recording start instruction is cancelled, image recording cannot be executed. Therefore, since the display of the second ink remaining amount information 99 is continued after the recording start instruction is cancelled, it is easy for a user to understand that image recording cannot be executed.

Furthermore, in the printer 100 according to the embodiment described above, the controller 9 adds a discharge amount of ink discharged from the nozzles 51 to the integrated value V stored in the RAM 93 each time the controller 9 performs the scanning processing once. Therefore, the calculated ink remaining amount C can be calculated with high accuracy.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, when the sheet P related to the recording start instruction has the large size, it is determined whether a remaining amount of ink at the time of receiving the recording start instruction is equal to or less than the predetermined amount M. However, the present invention is not limited thereto. The determination of the remaining amount of ink at the time of receiving the recording start instruction may be performed regardless of the size of the sheet P related to the recording start instruction.

In the embodiment described above, in a case where the size of the sheet P related to the recording start instruction is not large, when it is determined that a remaining amount of ink is equal to or less than the predetermined amount M and the calculated remaining amount of ink C is equal to or less than the threshold T during image recording, image recording on one sheet P related to the recording start instruction is completed. However, the present invention is not limited thereto. That is, when it is determined that the calculated ink remaining amount C is equal to or less than the threshold T, image recording on one sheet P may be interrupted.

In the embodiment described above, in a case where the size of the sheet P related to the recording start instruction is the large size, when it is determined that a remaining amount of ink is equal to or less than the predetermined amount M and the calculated ink remaining amount C is equal to or less than the threshold T during image recording, an interruption processing of interrupting the image recording is performed. However, the present invention is not limited thereto. That is, when the calculated ink remaining amount C is equal to or larger than the required ink amount N (S5: NO), the interruption processing may not be performed.

Furthermore, in the embodiment described above, when the calculated ink remaining amount C is less than the required ink amount N (S5: YES), the first ink remaining amount information 98 is displayed, and when image recording according to the recording start instruction is interrupted (S20), the second ink remaining amount information 99 is displayed. However, the present invention is not limited thereto. That is, the same information (for example, information simply indicating that ink is insufficient) may be displayed when the calculated ink remaining amount C is less than the required ink amount N and when image recording according to the recording start instruction is interrupted.

In the embodiment described above, the first ink remaining amount information 98 includes two pieces of information, that is, information indicating that a remaining amount of ink is insufficient for performing image recording according to the recording start instruction and information indicating that image recording on a sheet P having a size smaller than a size of the sheet P in the image recording according to the recording start instruction can be performed. However, the present invention is not limited thereto. The first ink remaining amount information 98 may include only one of these two pieces of information, or may not include these two pieces of information, and may be only information simply indicating that a remaining amount of ink is insufficient.

In the embodiment described above, after the first ink remaining amount information 98 is displayed on the display 95, when a cancel instruction instructing to cancel the recording start instruction is received, the display of the first ink remaining amount information 98 is ended. However, the present invention is not limited thereto. That is, the display of the first ink remaining amount information 98 may be continued after the cancel instruction is received.

In addition, in the embodiment described above, after the second ink remaining amount information 99 is displayed on the display 95, when a cancel instruction instructing to cancel the recording start instruction is received, the display of the second ink remaining amount information 99 is continued. However, the present invention is not limited thereto. That is, the display of the second ink remaining amount information 99 may be ended after the cancel instruction is received.

In the embodiment described above, the controller 9 adds a discharge amount of ink to the integrated value V each time the scanning processing is performed once. However, the discharge amount of ink may be added to the integrated value V each time the scanning processing is performed N times (N is multiple).

In the embodiment described above, four ink cartridges 10 are installed in the cartridge installation portion 8. However, the number of ink cartridges 10 installed in the cartridge installation portion 8 is not limited to four. For example, only one ink cartridge 10 may be installed.

In the embodiment described above, ink is supplied from the ink cartridge 10 to the head 5 through a tube (not shown) or the like. However, the present invention is not limited thereto. That is, for example, a sub tank that is disposed adjacent to the cartridge installation portion 8 and into which ink flows from the ink cartridge 10 installed in the cartridge installation portion 8 may be provided. In this case, the remaining amount sensor 81 may detect a remaining amount of ink in the ink cartridge 10 by detecting ink in the sub tank.

Furthermore, in the embodiment described above, the head 5 is a serial type head that discharges ink from the nozzles 51 while moving in the left-right direction. Alternatively, the head 5 may be a line type head that discharges ink from the nozzles in a state in which a position of the head 5 is fixed.

In addition, the present disclosure is applied to the printer 100 in the embodiment described above. However, the present invention is not limited thereto. The present invention can also be applied to a multifunction device, a copying device, and the like as long as the device is an inkjet image recording apparatus that discharges ink from a head.

What is claimed is:

1. An image recording apparatus comprising:

a cartridge installation portion, an ink cartridge being removably installed in the cartridge installation portion;

a sensor configured to detect whether a remaining amount of ink in the ink cartridge installed in the cartridge installation portion is equal to or less than a predetermined amount;

a recording head having a nozzle configured to discharge ink supplied from the ink cartridge, the recording head being configured to record an image on a recording medium with the ink discharged from the nozzle;

a memory; and a controller configured to:

determine whether the remaining amount of ink is equal to or less than the predetermined amount based on a detection signal from the sensor;

in a case it is determined that the remaining amount of ink during image recording on the recording medium by the recording head is equal to or less than the predetermined amount, integrate a discharge amount of ink from the nozzle in accordance with the image recording after the controller determines that the remaining amount of ink is equal to or less than the predetermined amount;

store in the memory an integrated value of the discharge amount of ink from the nozzle that is integrated in the integration of the discharge amount of ink; and determine whether a calculated ink remaining amount is equal to or less than a threshold, the calculated ink remaining amount being a remaining amount of ink calculated using the integrated value stored in the memory, the threshold being smaller than the predetermined amount, wherein (a) in the determining of the remaining amount of ink, in a case it is determined that the remaining amount of ink at a time of receiving a recording start instruction to start the image recording on one recording medium is equal to or less than the predetermined amount, the controller is configured to:

compare the calculated ink remaining amount with a required ink amount, the required ink amount being an amount of ink required for the image recording according to the recording start instruction; and in a case it is determined in the comparing that the calculated ink remaining amount is less than the required ink amount, not to start the image recording according to the recording start instruction, and wherein (b) in the determining of the remaining amount of ink, in a case it is determined that the remaining amount of ink at the time of receiving the recording start instruction is not equal to or less than the predetermined amount, the controller is configured to:

start the image recording according to the recording start instruction; and during the image recording according to the recording start instruction, in a case it is determined that the remaining amount of ink is equal to or less than the predetermined amount and that the calculated ink remaining amount is equal to or less than the threshold, interrupt the image recording according to the recording start instruction.

2. The image recording apparatus according to claim 1, wherein in the comparing of the calculated ink remaining amount with the required ink amount, in a case the calculated ink remaining amount is equal to or larger than the required ink amount, the controller is configured to start the image recording according to the recording start instruction.

3. The image recording apparatus according to claim 1, wherein the controller is configured to determine whether a size of the recording medium in the image recording according to the recording start instruction is a size larger than a standard size, and wherein in a case it is determined that the size of the recording medium in the image recording is a large size, which is the size larger than the standard size, then the controller is configured to perform the determining of the remaining amount of ink at a time of receiving the recording start instruction.

4. The image recording apparatus according to claim 3, wherein in the determining of the size of the recording medium, in a case it is determined that the size of the recording medium is not the large size, the controller is configured to start the image recording according to the recording start instruction, and wherein during the image recording according to the recording start instruction, in a case it is determined in the determining of the remaining amount of ink that the remaining amount of ink is equal to or less than the predetermined amount and it is determined in the determining of the calculated ink remaining amount that the calculated ink remaining amount is equal to or less than the threshold, after the image recording on said one recording medium according to the recording start instruction is completed, the controller is configured to not to start image recording according to a subsequent recording start instruction.

5. The image recording apparatus according to claim 1, further comprising:

a detector configured to detect whether the ink cartridge installed in the cartridge installation portion is replaced, wherein based on the detector detecting that the ink cartridge is replaced, the controller is configured to reset the integrated value stored in the memory.

6. The image recording apparatus according to claim 1, further comprising:

a display, wherein in a case it is determined in the comparing of the calculated ink remaining amount with the required ink amount that the calculated ink remaining amount is less than the required ink amount, the controller is configured to perform a first notification, the first notification comprising controlling the display to display first ink remaining amount information indicating that the remaining amount of ink is insufficient.

7. The image recording apparatus according to claim 6, wherein the first ink remaining amount information includes information indicating that the remaining amount of ink is insufficient for performing the image recording according to the recording start instruction.

8. The image recording apparatus according to claim 6, wherein the first ink remaining amount information includes information indicating that image recording on a recording medium having a size smaller than the size of the recording medium in the image recording according to the recording start instruction is executable.

9. The image recording apparatus according to claim 6, further comprising:

a user interface configured to receive a user's input, wherein based on the user interface receiving an instruction to cancel the recording start instruction after the performing of the first notification, the controller is configured to control the display to end the display of the first ink remaining amount information.

10. The image recording apparatus according to claim 1, further comprising:

a display, wherein in a case the image recording is interrupted, the controller is configured to perform a second notification, the second notification comprising controlling the display to display second ink remaining amount information indicating that the remaining amount of ink is insufficient.

11. The image recording apparatus according to claim 10, further comprising:

a user interface configured to receive a user's input, wherein based on the user interface receiving an instruction to cancel the recording start instruction after the second notification is performed, the controller is configured to control the display to continue the display of the second ink remaining amount information.

12. The image recording apparatus according to claim 1, further comprising:

a conveyance mechanism configured to convey the recording medium in a conveyance direction; and a carriage configured to support the recording head; and a movement mechanism configured to move the carriage in a scanning direction intersecting the conveyance direction, wherein the controller is configured to control the image recording apparatus to:

convey the recording medium in the conveyance direction by the conveyance mechanism; and record the image on the recording medium by the recording head while moving the carriage in the scanning direction by the movement mechanism, and wherein the controller is configured to add the discharge amount of ink from the nozzle to the integrated value stored in the memory each time the recording while moving is performed once.

13. The image recording apparatus according to claim 11, wherein the second ink remaining amount information further indicates a message prompting the user to replace the ink cartridge, and wherein the controller is configured to:

based on the user interface receiving the instruction to cancel the recording start instruction after the second notification is performed, discharge the recording medium while controlling the display to continue the notification of the second ink remaining amount information; and in a case it is determined that the ink cartridge is replaced, end the notification of the second ink remaining amount information.

* * * * *